United States Patent
Jones

[11] Patent Number: 5,838,230
[45] Date of Patent: *Nov. 17, 1998

[54] METHOD OF DETECTING A DEFLATED TIRE ON A VEHICLE

[75] Inventor: David Jones, Staffs, England

[73] Assignee: Sumitomo Rubber Industries, Ltd., Hyogo-ken, Japan

[*] Notice: The term of this patent shall not extend beyond the expiration date of Pat. No. 5,589,816.

[21] Appl. No.: 84,967

[22] Filed: Jul. 2, 1993

[30] Foreign Application Priority Data

Jul. 11, 1992 [GB] United Kingdom ............... 9214951
Apr. 1, 1993 [GB] United Kingdom ............... 9306847

[51] Int. Cl.$^6$ ................................................ B60C 23/00
[52] U.S. Cl. ........................ 340/444; 340/442; 73/146.2; 73/146.5
[58] Field of Search .................... 340/442, 443, 340/444; 73/146, 146.2, 146.3, 146.4, 146.5

[56] References Cited

U.S. PATENT DOCUMENTS

| | | | |
|---|---|---|---|
| 4,876,528 | 10/1989 | Walker et al. | 340/442 |
| 5,192,929 | 3/1993 | Walker et al. | 340/442 |
| 5,218,862 | 6/1993 | Hurrell, II et al. | 340/444 |
| 5,239,469 | 8/1993 | Walker et al. | 340/444 |
| 5,248,952 | 9/1993 | Walker et al. | 340/444 |
| 5,252,946 | 10/1993 | Walker et al. | 340/444 |
| 5,263,524 | 11/1993 | Boardman | 340/442 |
| 5,589,816 | 12/1996 | Jones | 340/444 |

FOREIGN PATENT DOCUMENTS

0489562 6/1992 European Pat. Off. .

Primary Examiner—Nina Tong

[57] ABSTRACT

A method of detecting a deflated tire on a vehicle by comparing the rolling radii of the tires by means of comparing angular velocity speed signals from wheel speed sensors one at each wheel characterized by calculating an error value (DEL') where DEL'=[[(C1+C4)/2−(C2+C3)/2]×100]/[(C1+C2+C3+C4)/4] where C1, C2, C3 and C4 are angular velocity values for left-hand front, right-hand front, left-hand rear and right-hand rear wheels of the vehicle respectively, determining a correction factor LAT, calculating a corrected error value DEL wherein in the case that the sign of the product LAT×A of the correction factor LAT and the vehicle related constant A is opposite to the sign of the error value DEL' then the corrected error value DEL is given by DEL=DEL', and in the case that the product LAT×A and the error value DEL' have the same sign but the product LAT×A is greater in absolute magnitude then the error value DEL' the corrected error value DEL is given by DEL=0, otherwise the corrected error value DEL is given by DEL= DEL'−(LAT×A) and a tire warning indicator is operated in the vehicle to indicate that at least one tire is deflected when it is sensed that the magnitude of the corrected error value DEL is in the range 0.05 to 0.5.

19 Claims, 3 Drawing Sheets

METHOD OF DETECTING A DEFLATED TIRE ON A VEHICLE

This invention relates to a method of detecting a deflated tire on a vehicle suitable for cars, trucks or the like.

BACKGROUND OF THE INVENTION

Prior applications such as French Patent Publication No 2568519 and European Patent Publication No 291 217 propose using wheel speed signals from the vehicle wheels such as for example the signals from an anti-lock braking system which are multi-pulse signals of typically 48 to 96 pulses per revolution of each wheel. The prior art system compares the speed derived signals in various ways, and also attempt to overcome errors due to vehicle factors such as cornering, braking, accelerating, uneven or changing loads, which can cause changes in the speed signals which are larger than those caused by a tire deflation of, for example, 0.4 bar.

French Patent Publication 2568519 avoided errors of this type by monitoring the speeds of the diagonally opposed pairs of wheels for a long time or distance period so that it averaged out effectively cornering of the vehicle. The result however was that the device operated very slowly taking many Kilometres to sense a pressure loss.

European Patent Publication No 291 217 improved the situation by calculating the lateral and longitudinal acceleration of the vehicle using the same four wheel speed signals and setting fixed limits above which the detection system was inhibited to avoid false signals due to cornering and acceleration. This inhibition of detection however meant that for a proportion of the time of vehicle running the system was not sensing punctures, the actual proportion depending upon the type of roads and the way the vehicle was being driven.

The real difficulty with these types of systems is that, apart from the lateral acceleration of the vehicle which occurs during cornering causing increased deflection of the outer pair of wheels compared to the inner pair of wheels, each vehicle has different characteristics due to the position of the centre of gravity and the type of suspension and these different characteristics when cornering produce additional deflections in the outer pairs of tires with regard to the inner pairs of tires.

The vehicle characteristics make the deflections different in each of the tires. Similar problems occur due to vehicle characteristics in the deflections in the front pair of tires compared to the rear pair when the vehicle brakes, and vice-versa when the vehicle accelerates.

In our prior Application No 9214951.7 dated 11 Jul. 1992 there is provided a method of detecting a deflated tire on a vehicle by comparing the rolling radii of the tires by means of comparing angular velocity speed signals from wheel speed sensors one at each wheel characterised by calculating an error value DEL' from the four wheel speed signals, determining a correction factor LAT, calculating a corrected error value DEL where $$DEL = DEL' - LAT \times A$$

wherein A is a vehicle related constant, and operating a tire warning indicator provided in the vehicle to indicate that at least one tire is deflated when it is sensed that the magnitude of the corrected error value DEL is in the range 0.05 to 0.5.

While the above-described prior method is able to detect a deflated tire in most circumstances, under certain extreme conditions such as severe cornering espectially on wet, slippery or loose road surfaces then false signals occur.

SUMMARY OF THE INVENTION

It is an object of the present invention to provide a method of detecting a deflated tire on a vehicle which accommodates the above changes, avoiding false signals and detecting deflation for substantially all the time when the vehicle is running.

Accordingly, the present invention provides a method of detecting a deflated tire on a vehicle by comparing the rolling radii of the tires by means of comparing angular velocity speed signals from wheel speed sensors one at each wheel characterised by calculating an error value (DEL') where $$DEL' = \frac{[(C1 + C4)/2 - (C2 + C3)/2]}{(C1 + C2 + C3 + C4)/4} \times 100$$

where C1, C2, C3 and C4 are angular velocity values for left-hand front, right-hand front, left-hand rear and right-hand rear wheels of the vehicle, respectively, determining a correction factor (LAT), calculating a corrected error value (DEL) wherein in the case that the sign of the product LAT×A of the correction factor LAT and a vehicle related constant A is opposite to the sign of the error value DEL' then the corrected error value DEL is given by $$DEL = DEL'$$

and in the case that the product LAT×A and the error value DEL' have the same sign but the product LAT×A is greater in absolute magnitude then the error value DEL' the corrected error value DEL is given by $$DEL = 0$$

otherwise the corrected error value DEL is given by $$DEL = DEL' - (LAT \times A)$$

and a tire warning indicator is operated in the vehicle to indicate that at least one tire is deflected when it is sensed that the magnitude of the corrected error value DEL is in the range 0.05 to 0.5.

Preferably the tire warning indicator is operated when the magnitude of the corrected error value is in the range 0.1 to 0.3.

The vehicle related constant preferably has a value in the range −2.0 E-7 to +2.0 E-7.

The correction factor LAT may be selected by calculating from the four angular velocity values C1, C2, C3 and C4 respective first, second, third and fourth deciding factors (MC1, MC2, MC3, MC4) where MC1=C1

$$MC2 = C2/[(C2 + C4)/(C1 + C3)]$$
$$MC3 = C3/[(C3 + C4)/(C1 + C2)]$$
$$MC4 = C4/[[(C2 + C4)/(C1 + C3)] \times [(C3 + C4)/(C1 + C2)]]$$

summing the four deciding factors and multiplying this sum by a centralising constant (K) to give a central deciding factor (MPSD) and selecting the correction factor (LAT) as follows, if the first or second deciding factor (MC1 or MC2) is greater than the central deciding factor (MPSD) then $$LAT = 2 \times (C3 - C4) \times (C1 + C2 + C3 + C4),$$

if the third or fourth deciding factor (MC3 or MC4) is greater than the central deciding factor (MPSD) then $LAT=2\times(C1-C2)\times(C1+C2+C3+C4)$, or if none of the deciding factors (MC1, MC2, MC3 or MC4) is greater than the central deciding factor (MPSD) then $LAT=(C1+C3-C2-C4)\times(C1+C2+C3+C4)$.

The centralising constant used in the derivation of the central deciding factor MPSD may be in the range of 0.250125 to 0.250625 and preferably has a value of 0.25025.

The particular tire which is deflated may be detected by calculating for each wheel a deflation indicating factor IMC1, IMC2, IMC3 and IMC4, respectively, and then selecting the factor having the largest numerical value, the deflation indicating factors being calculated as follows:

$IMC1 = C1$ if the first deciding factor (MC1) is greater than the central deciding factor (MPSD) then $IMC2 = C2/[((C4/C3)/2) + 0.5]$ $IMC3 = C3/[((C4/C2)/2) + 0.5]$ $IMC4 = C4/[[((C4/C3)/2) + 0.5] \times [((C4/C2)/2) + 0.5]]$;

if the second deciding factor (MC2) is greater than the central deciding factor (MPSD) then $IMC2 = C2/[((C4/C3)/2) + 0.5]$ $IMC3 = C3/[((C3/C1)/2) + 0.5]$ $IMC4 = C4/[[((C4/C3)/2) + 0.5] \times [((C3/C1)/2 + 0.5)]]$;

if the third deciding factor (MC3) is greater than the central deciding factor (MPSD) then $IMC2 = C2/[((C2/C1)/2) + 0.5]$ $IMC3 = C3/[((C4/C2)/2) + 0.5]$ $IMC4 = C4/[[((C2/C1)/2) + 0.5] \times [((C4/C2)/2) + 0.5]]$;

if the fourth deciding factor (MC4) is greater than the central deciding factor (MPSD) then $IMC2 = C2/[((C2/C1)/2) + 0.5]$ $IMC3 = C3/[((C3/C1)/2) + 0.5]$ $IMC4 = C4/[[((C2/C1)/2) + 0.5] \times [((C3/C1)/2) + 0.5]]$;

or if none of the deciding factors (MC1, MC2, MC3, MC4)

is greater than the central deciding (MPSD) factor then $IMC2 = C2/[((C2 + C4)/(C1 + C3))/2 + 0.5]$ $IMC3 = C3/[(((C3 + C4)/(C1 + C2))/2) + 0.5]$ $IMC4 = C4/[[((C3 + C4)/(C1 + C2))/2) + 0.5] \times$ $[((C2 + C4)/C1 + C3))/2 + 0.5]]$.

While the invention in fact compares the angular velocities of the wheels it should be understood that this can be done by comparing the times for one full turn of each wheel or by comparing digital signals for multipulse wheel speed generators.

To allow for tires from different manufacturers which may therefore be of different sizes, an initialization procedure may be carried out. This monitors the signals under normal driving conditions and enables constants for each wheel to be determined to allow for variations.

BRIEF DESCRIPTION OF THE DRAWINGS

Further aspects of the present invention will become apparent from the following description, by way of example only, of one embodiment in conjunction with the attached diagrammatic drawings in which.

DETAILED DESCRIPTION OF THE INVENTION

Figure 1:
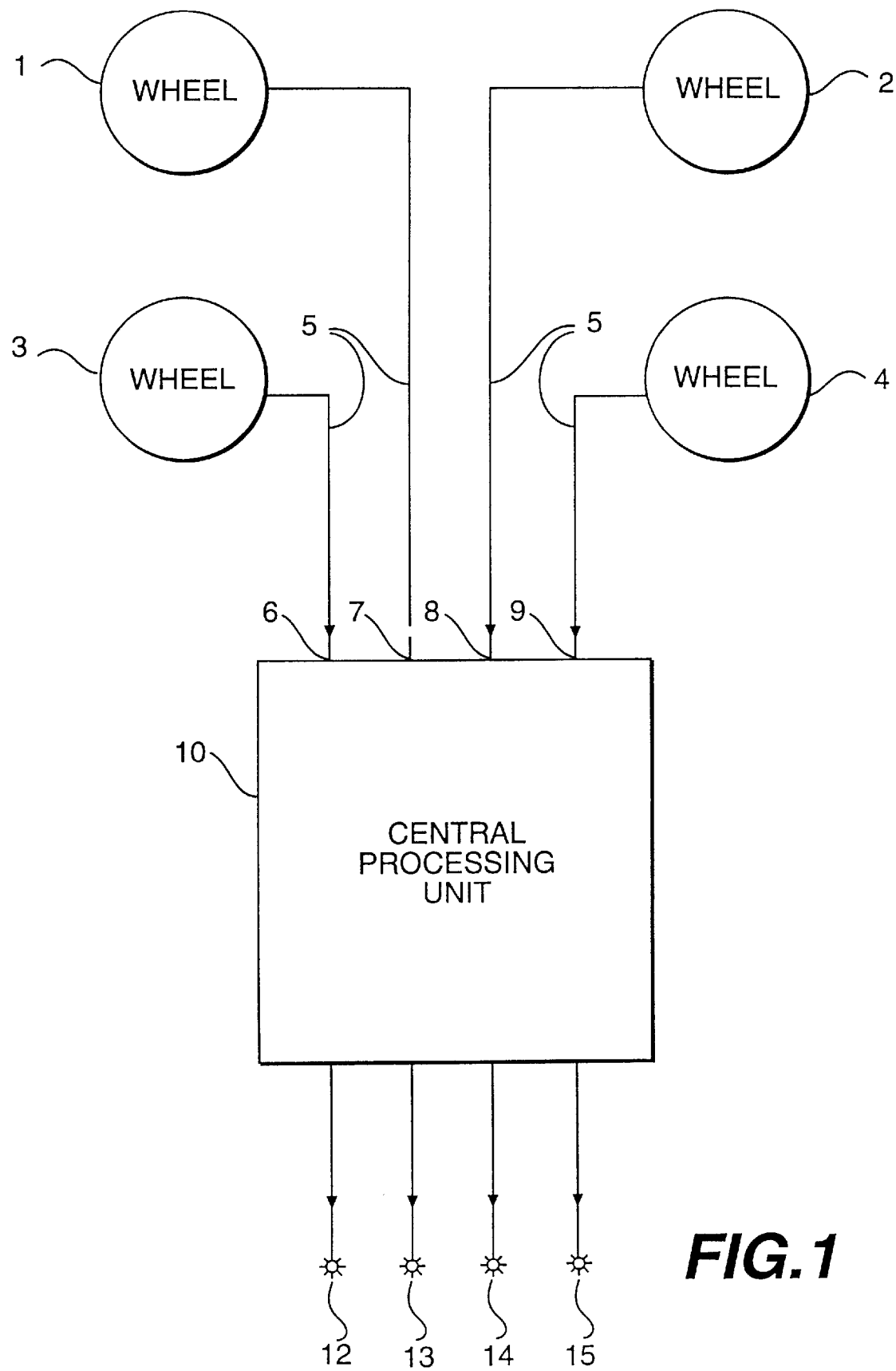
FIG. 1 is a schematic diagram showing a deflation warning device for a car having four wheels.

The apparatus shown in FIG. 1 provides a deflation warning device for a vehicle having four wheels 1, 2, 3 and 4. Wheels 1 and 2 are the left- and right-hand front wheels, respectively, and wheels 3 and 4 are the left- and right-hand rear wheels, respectively. Each wheel has a toothed wheel device associated with it of the type designed and fitted to provide a digital signal following a lateral magnetic pick-up suitable for a vehicle anti-skid system of the electronic type—often commonly known as ABS braking system. Each pick-up is additionally connected in this case to a deflation warning detection system which uses the same digital signal as the ABS system.

The electronic signals from each of the four wheels are carried through cables 5 to four separate inputs 6, 7, 8 and 9 of a central processing unit 10. Four separate indicator lights 12, 13, 14 and 15 are provided one for each wheel 1, 2, 3 and 4. These indicator lights may be most conveniently mounted on the vehicle dashboard.

The central processing unit 10 is basically a microprocessor which monitors the four signals and compares them to determine if an outward signal is to be sent to operate an indicator light to warn of a deflated tire. In the case where the vehicle already has an ABS system fitted then the microprocessor 10 may be the same microprocessor as the ABS system. Alternatively, a separate microprocessor may be provided.

The respective values of the total digital pulse signals from each of the wheels 1, 2, 3 and 4 in a five second period are C1, C2, C3 and C4, respectively. The central processing unit 10 computes these frequency values as will be described below to determine whether or not to send a deflation warning signal to one of the warning lights 12, 13, 14 or 15.

Figure 2:
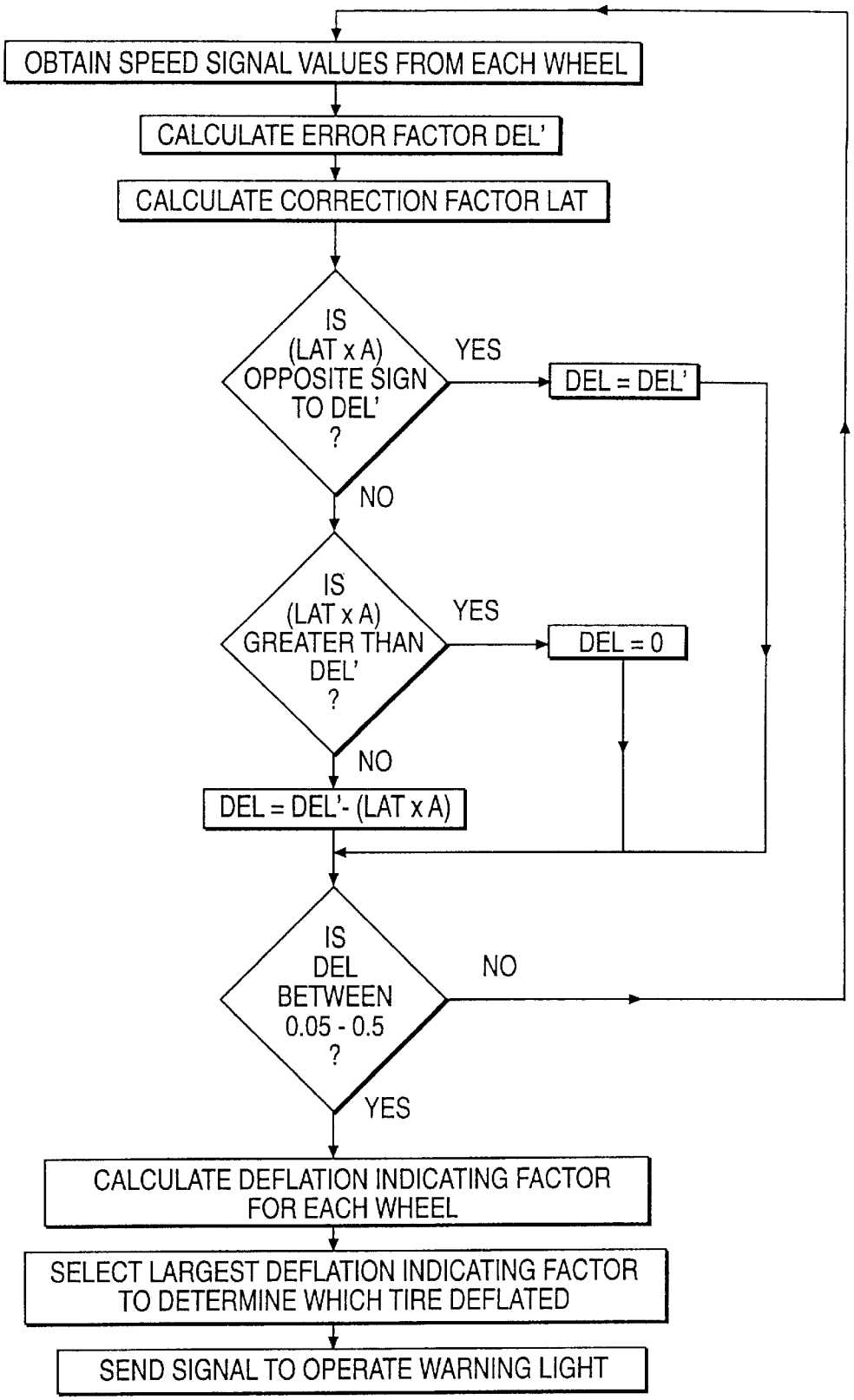
FIG. 2 is a schematic diagram showing the sequence of computations used to determine if a deflated tire exists and decide which one is deflated.

The sequence of operations used in this computation is shown schematically in FIG. 2.

The first operation in the method of the invention is to calculate from the actual wheel speed values C1–C4 an error value DEL' where $$DEL' = \frac{[(C1 + C4)/2 - (C2 + C3)/2]}{(C1 + C2 + C3 + C4)/4} \times 100$$

However because the actual wheel speed values may be distorted due to vehicle factors such as cornering, braking, accelerating or uneven loads which give rise to a greater effect than that caused by a tire deflation it is necessary to correct this calculated error value to remove these vehicle effects.

To correct the error value DEL' a correction factor LAT is calculated according to the magnitude of respective deciding factors MC1–MC4 for each wheel in comparison to a central deciding factor MPSD.

The central deciding factor is equal to the sum for the four deciding factors MC1–MC2 multiplied by a centralising constant K which in this embodiment is selected to be 0.25025. The value of the correction factor LAT is then calculated depending on which if any of the four deciding factors MC1–MC4 is greater in magnitude than the central deciding factor MPSD as follows:

| if | $MC1$ or $MC2 > MPSD$ |
|---|---|
| then | $LAT = 2 \times (C3 - C4) \times (C1 + C2 + C3 + C4)$ |
| or if | $MC3$ or $MC4 > MPSD$ |
| then | $LAT = 2 \times (C1 - C2) \times (C1 + C2 + C3 + C4)$ |
| otherwise | |
| | $LAT = (C1 + C3 - C2 - C4) \times (C1 + C2 + C3 + C4)$ |

Figure 3:
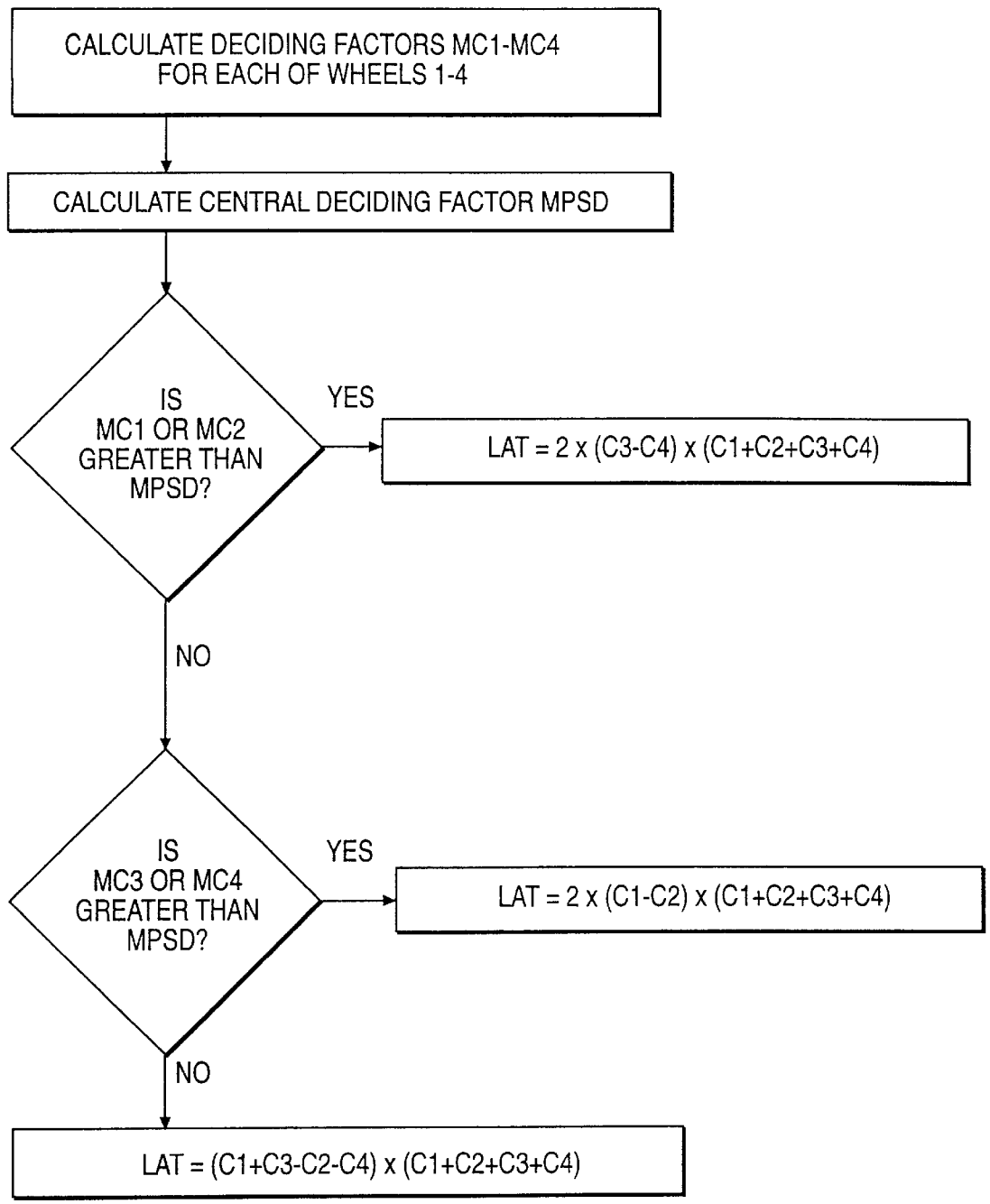
FIG. 3 is a schematic diagram showing the sequence of computations used in determining the correction factor LAT.

This sequence of operations is shown in FIG. 3.

The calculated error value DEL' may be further corrected to remove vehicle effects by using a vehicle related constant A. This constant A allows for vehicle factors such as the vehicle track and other dimensions and characteristics of the suspension particularly in relation to side-to-side tilt. The value of this constant A for the particular vehicle may be determined by experiment. Values which have been established for cars include $+1.3 \times 10^{-7}$ for a Jaguar XJ6, $-0.6 \times 10^{-7}$ for a Peugeot 405 and $-2.0 - 10^{-7}$ for an Audi 100.

The purpose of the vehicle related constant A is to provide proper correct of DEL' for vehicle characteristics and its value reflects the vehicle performance under average driving conditions on normal roads. However under extreme driving conditions such as high speed or severe cornering or on slippery or loose road surfaces it may be the case that this value of A is inappropriate and does not properly correct DEL'. It is therefore first necessary to apply tests to determine if it is appropriate to use the vehicle related constant A in the correction of DEL'.

The first of these tests consists of comparing the sign of the product LAT×A of the correction factor LAT and the vehicle related constant A with the sign of the calculated error factor DEL'. If these two quantities are opposite in sign then no correction is applied to DEL' and the corrected error factor DEL is set to equal DEL'. If LAT×A and DEL have the same sign then a second test is applied which compares the absolute magnitude, that is the magnitude regardless of sign, of LAT×A and DEL'. If the value of LAT×A is greater than that of DEL' then the value of the corrected error factor DEL is set at zero. If the value of LAT×A is less than or equal to DEL' then the full correction is applied and the corrected error factor DEL is set to equal DEL' minus the product (LAT×A):

$$DEL = DEL' - (LAT \times A).$$

This sequence of computations is shown in FIG. 2.

Having calculated the corrected error value DEL the central processing unit 10 then decides if the value of DEL is in the range of 0.05 to 0.5 which indicates the presence of a deflated tire.

Values of DEL below 0.05 are the result of minor statistical variation in the counts from each wheel whereas values of DEL greater than 0.5 indicate a relatively uncommon occurrence such as wheel spin or a locked wheel and are greater than the effect of a punctured tire.

If the central processing unit 10 finds that the corrected error value is between 0.05 and 0.5 then the method of the invention moves on to the next stage which is to determine which tire is deflated. Otherwise the system continues to monitor wheel speeds.

To determine which tire is deflated the central processing unit 10 calculates for each wheel a deflation indicating factor IMC1–IMC4. These factors are calculated according to the following procedure:

$IMC1 = C1$ if the first deciding factor ($MC1$) is greater than the central deciding factor ($MPSD$) then $IMC2 = C2/[((C4/C3)/2) + 0.5]$ $IMC3 = C3/[((C4/C2)/2) + 0.5]$ $IMC4 = C4/[[((C4/C3)/2) + 0.5] \times [((C4/C2)/2) + 0.5]]$;

if the second deciding factor ($MC2$) is greater than the central deciding factor ($MPSD$) then $IMC2 = C2/[((C4/C3)/2) + 0.5]$ $IMC3 = C3/[((C3/C1)/2 + 0.5]$ $IMC4 = C4/[[((C4/C3)/2) + 0.5] \times [((C3/C1)/2 + 0.5)]]$;

if the third deciding factor ($MC3$) is greater than the central deciding factor ($MPSD$) then $IMC2 = C2/[((C2/C1)/2) + 0.5]$ $IMC3 = C3/[((C4/C2)/2) + 0.5]$ $IMC4 = C4/[[((C2/C1)/2) + 0.5] \times [((C4/C2)/2) + 0.5]]$;

if the fourth deciding factor ($MC4$) is greater than the central deciding factor ($MPSD$) then $IMC2 = C2/[((C2/C1)/2) + 0.5]$ $IMC3 = C3/[((C3/C1)/2) + 0.5]$ $IMC4 = C4/[[((C2/C1)/2) + 0.5] \times [((C3/C1)/2) + 0.5]]$;

or if none of the deciding factors ($MC1$, $MC2$, $MC3$, $MC4$)

is greater than the central deciding ($MPSD$) factor then $IMC2 = C2/[(((C2 + C4)/(C1 + C3))/2) + 0.5]$ $IMC3 = C3/[(((C3 + C4)/(C1 + C2))/2) + 0.5]$ $IMC4 = C4/[[(((C3 + C4)/(C1 + C2))/2) + 0.5] \times$ $[(((C2 + C4)/C1 + C3))/2) + 0.5]]$.

Thus having obtained a deflation indicating factor for each of the four wheels the central processing unit compares these to determine which wheel has the factor of the largest magnitude. A signal is then sent to operate the indicator light corresponding to that wheel in order to alert the driver that the tire concerned has deflated. In a preferred arrangement the warning signal is only sent after three sets of deflation indicating factors, calculated from successive sets of wheel speed data, all indicate that a particular tire is deflated.

While the above embodiment has illustrated the method of the invention using the signal data from a multi-toothed wheel system typically producing 48 or 96 pulses per wheel revolution the invention can equally be used with other wheel speed sensing systems. For example the method may be used with a simple system which uses a single pulse per revolution to compute the time period for one rotation of each wheel, in which case it will be necessary to multiply the wheel speeds by a constant factor to obtain data in the necessary form.

Having now described my invention what I claim is:

1. A method of detecting a deflated tire on a vehicle comprising the steps of:

rotating each tire of the vehicle;

providing one wheel speed sensor for each of the tires;

detecting the angular velocity speed of the tires by the wheel speed sensors;

comparing the rolling radii of the tires by means of comparing angular velocity speed signals from the wheel speed sensors characterized by calculating an error value DEL' where $$DEL' = \frac{[(C1+C4)/2 - (C2+C3)/2]}{(C1+C2+C3+C4)/4} \times 100$$

where C1, C2, C3 and C4 are angular velocity values for left-hand front, right-hand front, left-hand rear and right-hand rear wheels of the vehicle, respectively, determining a correction factor LAT, calculating a corrected error value DEL wherein in the case that the sign of product LAT×A or the correction factor LAT and a vehicle related constant A is opposite to the sign of the error value DEL' then the corrected error value DEL is given by

DEL=DEL' and in the case that the product LAT×A and the error value DEL' have the same sign but the product LAT×A is greater in absolute magnitude than the error value DEL' then the corrected error value DEL is given by

DEL=0 otherwise the corrected error value DEL is given by

DEL=DEL'−(LAT×A)

and a tire warning indicator is operated in the vehicle to indicate that at least one tire is deflected when the magnitude of the corrected error value DEL is sensed in the range of 0.05 to 0.5.

2. The method of detecting a deflated tire according to claim 1, wherein the correction factor LAT is selected by calculating from the angular velocity values C1, C2, C3 and C4 respective first, second, third and fourth deciding factors MC1, MC2, MC3, and MC4 where $MC1 = C1$
$MC2 = C2/[(C2+C4)/(C1+C3)]$
$MC3 = C3/[(C3+C4)/(C1+C2)]$
$MC4 = C4/[[(C2+C4)/(C1+C3)] \times [(C3+C4)/(C1+C2)]]$, then summing the first, second, third and fourth deciding factors and multiplying this sum by a centralizing constant K to give a central deciding factor MPSD and selecting the correction factor LAT as follows, if the first or second deciding factor MC1 or MC2 is greater than the central deciding factor MPSD then

LAT=2×(C3×C4)×(C1+C2+C3+C4), if the third or fourth deciding factor MC3 or MC4 is greater than the central deciding factor MPSD then

LAT=2×(C1×C2)×(C1+C2+C3+C4), or if none of the deciding factors MC1, MC2, MC3 or MC4 is greater than the central deciding factor MPSD then

LAT=(C1+C3−C2−C4)×(C1+C2+C3+C4).

3. The method of detecting a deflated tire according to claim 2, wherein the centralizing constant K has a value in the range of 0.250125 to 0.250625.

4. The method of detecting a deflated tire according to claim 2, wherein the centralizing constant K has a value of 0.25025.

5. The method of detecting a deflated tire according to claim 2, wherein deflation indicating factors IMC1, IMC2, IMC3, IMC4 are calculated for each wheel, respectively, and the wheel having the numerically greatest of the deflation indicating factor is indicated as deflated, where the deflation indicating factors are calculated as follows:

$IMC1 = C1$, then if the first deciding factor ($MC1$) is greater than the central deciding factor $MPSD$ then $IMC2 = C2/[((C4/C3)/2) + 0.5]$ $IMC3 = C3/[((C4/C2)/2) + 0.5]$ $IMC4 = C4/[[((C4/C3)/2) + 0.5] \times [((C4/C2)/2) + 0.5]]$;

if the second deciding factor $MC2$ is greater than the central deciding factor $MPSD$ then $IMC2 = C2/[((C4/C3)/2) + 0.5]$ $IMC3 = C3/[((C3/C1)/2) + 0.5]$ $IMC4 = C4/[[((C4/C3)/2) + 0.5] \times [((C3/C1)/2) + 0.5]]$;

if the third deciding factor $MC3$ is greater than the central deciding factor $MPSD$ then $IMC2 = C2/[((C2/C1)/2) + 0.5]$ $IMC3 = C3/[((C4/C2)/2) + 0.5]$ $IMC4 = C4/[[((C2/C1)/2) + 0.5] \times [((C4/C2)/2) + 0.5]]$;

if the fourth deciding factor $MC4$ is greater than the central deciding factor $MPSD$ then $IMC2 = C2/[((C2/C1)/2) + 0.5]$ $IMC3 = C3/[((C3/C1)/2) + 0.5]$ $IMC4 = C4/[[((C2/C1)/2) + 0.5] \times [((C3/C1)/2) + 0.5]]$;

or if none of the first, second, third and fourth deciding factors $MC1, MC2, MC3, MC4$ is greater than the central deciding $MPSD$ factor then $IMC2 = C2/[(((C2+C4)/(C1+C3))/2) + 0.5]$ $IMC3 = C3/[(((C3+C4)/(C1+C2))/2) + 0.5]$ $IMC4 = C4/[[(((C3+C4)/(C1+C2))/2) + 0.5] \times$ $[(((C2+C4)/(C1+C3))/2) + 0.5]]$.

6. The method of detecting a deflated tire according to claim 2, wherein the range at which the tire warning indicator is operated when the magnitude of the corrected error value DEL is sensed is 0.1 to 0.3.

7. The method of detecting a defined tire according to claim 2, wherein the value of the vehicle related constant A is in the range of −2.0E-7 to +2.0E-7.

8. The method of detecting a deflated tire according to claim 2, wherein the value of the vehicle related constant A is −2.0E-7.

9. The method of detecting a deflated tire according to claim 2, wherein the value of the vehicle related constant A is −0.6E-7.

10. The method of detecting a deflated tire according to claim 2, wherein the value of the vehicle related constant A is +1.3E-7.

11. A deflated tire detector comprising:

a plurality of speed sensors each provided for a corresponding tire of a plurality of tires on a vehicle, each of said speed sensors outputting an angular velocity of said corresponding tire;

means for comparing rolling radii of said tires including means for calculating an error signal (DEL') where $$DEL' = \frac{[(C1+C4)/2 - (C2+C3)/2] \times 100}{(C1+C2+C3+C4)/4}$$

where C1, C2, C3 and C4 are angular velocity output by said speed sensors for left-hand front, right-hand front, left-hand rear and right-hand rear tires of the vehicle respectively, means for determining a correction factor (LAT), means for determining a corrected error signal (DEL) wherein in the case that the sign of product LAT×A or the correction factor ACT and a vehicle related constant A is opposite to the sign of the error value DEL' then the corrected error value DEL is given by

DEL=DEL' and in the case that the product LAT×A and the error value DEL' have the same sign but the product LAT×A is greater in absolute magnitude than the error value DEL' then the corrected error value DEL is given by

DEL=0 otherwise the corrected error value DEL is given by

DEL=DEL'−(LAT×A)

means for determining when a magnitude of said corrected error signal is between 0.05 and 0.5 and for outputting a warning signal in response thereto; and a warning indicator, receiving said warning signal and providing a warning in accordance therewith.

12. The deflated tire detector according to claim 11, wherein said warning indicator is a light in the vehicle.

13. The deflated tire detector according to claim 12, wherein said warning indicator comprises a plurality of warning indicators, corresponding to said plurality of speed sensors.

14. The deflated tire detector according to claim 13, wherein each of said speed sensors comprises a toothed wheel device.

15. The deflated tire detector according to claim 11, wherein said means for determining said correction factor LAT comprises:

means for calculating, from the four angular velocity values C1, C2, C3 and C4, respective first, second, third and fourth deciding factors MC1, MC2, MC3, MC4 where $MC1 = C1$
$MC2 = C2/[(C2+C4)/(C1+C3)]$
$MC3 = C3/[(C3+C4)/(C1+C2)]$
$MC4 = C4/[[(C2+C4)/(C1+C3)] \times [(C3+C4)/(C1+C2)]]$;

means for summing the four deciding factors and outputting a sum;

means for muLtiplying said sum by a centralizing constant K to give a central deciding factor MPSD; and means for selecting the correction factor LAT as follows, if the first or second deciding factor MC1 or MC2 is greater than the central deciding factor MPSD then

LAT=2×(C3−C4)×(C1+C2+C3+C4), if the third or fourth deciding factor MC3 or MC4 is greater than the central deciding factor MPSD then

LAT=2×(C1−C2)×(C1+C2+C3+C4), or if none of the deciding factors MC1, MC2, MC3 or MC4 is greater than the central deciding factor MPSD then

LAT=(C1+C3−C2−C4)×(C1+C2+C3+C4).

16. The deflated tire detector according to claim 15, wherein centralizing constant K has a value in the range 0.250125 to 0.250625.

17. The deflated tire detector according to claim 15, wherein centralizing constant K has a value of 0.25025.

18. The deflated tire detector according to claim 15, further comprising means for calculating a deflation indicating factor IMC1, IMC2, IMC3, IMC4 for each wheel respectively and means for indicating the wheel having the numerically greater deflation indicating factor as being deflated, where the calculation of the deflation indicating factors comprises:

$IMC1 = C1$, then if the first deciding factor $MC1$ is greater than the central deciding factor $MPSD$ then $IMC2 = C2/[((C4/C3)/2) + 0.5]$ $IMC3 = C3/[((C4/C2)/2) + 0.5]$ $IMC4 = C4/[[((C4/C3)/2) + 0.5] \times [((C4/C2)/2 + 0.5]]$;

if the second deciding factor $MC2$ is greater than the central deciding factor $MPSD$ then $IMC2 = C2/[((C4/C3)/2) + 0.5]$ $IMC3 = C3/[((C3/C1)/2) + 0.5]$ $IMC4 = C4/[[((C4/C3)/2) + 0.5] \times [((C3/C1)/2) + 0.5]]$;

if the third deciding factor $MC3$ is greater than the central deciding factor $MPSD$ then $IMC2 = C2/[((C2/C1)/2) + 0.5]$ $IMC3 = C3/[((C4/C2)/2) + 0.5]$ $IMC4 = C4/[[((C2/C1)/2) + 0.5] \times [((C4/C2)/2) + 0.5]]$;

-continued if the fourth deciding factor $MC4$ is greater than the central deciding factor $MPSD$ then $IMC2 = C2/[((C2/C1)/2) + 0.5]$ $IMC3 = C3/[((C3/C1)/2) + 0.5]$ $IMC4 = C4/[[((C2/C1)/2) + 0.5] \times [((C3/C1)/2) + 0.5]];$ or if none of the deciding factors $MC1, MC2, MC3, MC4$ is greater than the central deciding $MPSD$ factor then $IMC2 = C2/[(((C2 + C4)/(C1 + C3))/2) + 0.5]$ -continued $IMC3 = C3/[(((C3 + C4)/(C1 + C2))/2) + 0.5]$ $IMC4 = C4/[[(((C3 + C4)/(C1 + C2))/2) + 0.5] \times [(((C2 + C4)/(C1 + C3))/2) + 0.5]].$ 19. The deflated tire detector according to claim 11 wherein the value of the vehicle related constant A is in the range −2.0E-7 to +2.0E-7.

* * * * *